(12) United States Patent
Ezrielev et al.

(10) Patent No.: US 12,705,356 B2
(45) Date of Patent: Aug. 11, 2026

(54) LOW-COST DATA DECRYPTION OF ADAPTIVE-PRICING RANSOMWARE WITH HONEYPOT (FOR ASYMMETRIC KEYS MALWARE)

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 240 days.

(21) Appl. No.: 18/299,379

(22) Filed: Apr. 12, 2023

(65) Prior Publication Data

US 2024/0346146 A1 Oct. 17, 2024

(51) Int. Cl.
*G06F 21/56* (2013.01)
*G06F 21/60* (2013.01)

(52) U.S. Cl.
CPC .......... *G06F 21/568* (2013.01); *G06F 21/602* (2013.01)

(58) Field of Classification Search
CPC ............................. G06F 21/568; G06F 21/602
See application file for complete search history.

(56) References Cited

U.S. PATENT DOCUMENTS

2018/0107824 A1* 4/2018 Gibbons, Jr. ......... G06F 21/565
2018/0293379 A1* 10/2018 Dahan ................... G06F 21/568
2020/0042707 A1* 2/2020 Kucherov ............ G06F 3/0683
2020/0204589 A1* 6/2020 Strogov .............. H04L 63/1416

FOREIGN PATENT DOCUMENTS

WO WO-2022002405 A1 * 1/2022

* cited by examiner

*Primary Examiner* — Jeffrey C Pwu
*Assistant Examiner* — Mayasa A. Shaawat
(74) *Attorney, Agent, or Firm* — Workman Nydegger

(57) ABSTRACT

One method includes detecting, at a data storage site, a ransomware process, taking a snapshot of the ransomware process, using the snapshot to install an instance of the ransomware process on a honeypot system, receiving, from an attacker, a first demand for a ransom of data stored at the data storage site, and receiving, from the attacker, a second demand for a ransom of data stored in the honeypot system, and ransom of the second demand is less than the ransom of the first demand. A private key is received from the attacker after payment of the ransom of the second demand, but without payment of the ransom of the first demand, and the private key is then used to decrypt the data at the data storage site.

15 Claims, 3 Drawing Sheets

LOW-COST DATA DECRYPTION OF ADAPTIVE-PRICING RANSOMWARE WITH HONEYPOT (FOR ASYMMETRIC KEYS MALWARE)

FIELD OF THE INVENTION

Embodiments of the present invention generally relate to ransomware detection and remediation. More particularly, at least some embodiments of the invention relate to systems, hardware, software, computer-readable media, and methods, for dealing with encryptions of data such as may be implemented by ransomware.

BACKGROUND

Many ransomware processes include an encryption component that operates to encrypt target data. The encryption of the data prevents the data owner from using the data until a ransom is paid to the attacker, who may then provide the data owner with a key to decrypt the data. Thus, without the key, the data is unusable by the data owner, and the business and other operations of the owner may be significantly compromised. Ransomware processes that employ asymmetric encryption, in which different respective keys are used to encrypt, and decrypt, data, may be challenging.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
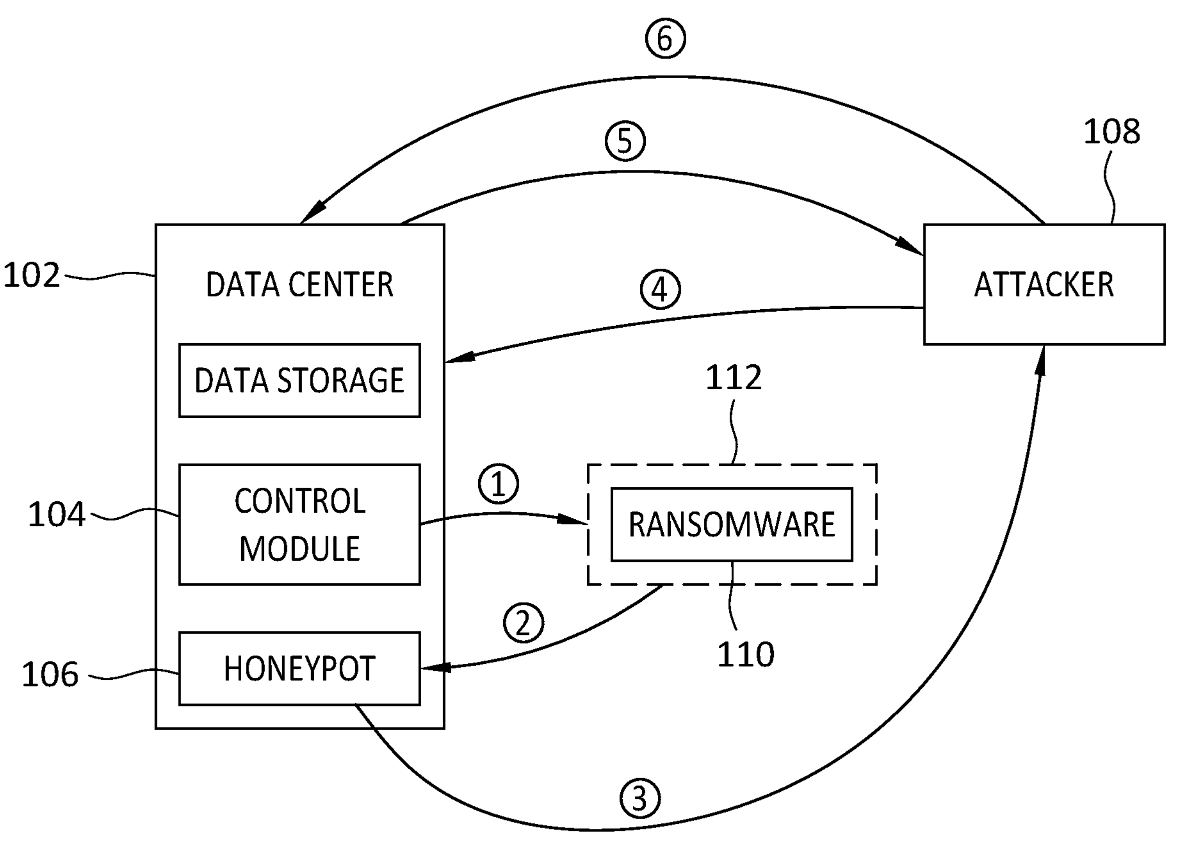
FIG. 1 discloses aspects of the functions and operation of an embodiment.

Embodiments of the present invention generally relate to ransomware detection and remediation. More particularly, at least some embodiments of the invention relate to systems, hardware, software, computer-readable media, and methods, for dealing with asymmetric encryptions of data such as may be implemented by ransomware.

One example embodiment may be implemented in connection with a ransomware process that uses a public key to encrypt data, and a private key to decrypt the encrypted data. The operation of the ransomware may be detected, and a snapshot taken of the ransomware process. The snapshot may be used to infect a dummy, or honeypot, system controlled by the data owner, and the attacker may become aware of that infection when the snapshotted ransomware running in the honeypot system reports the infection of the honeypot system to the attacker. When the attacker has become aware of the successful infection of the honeypot system, the attacker may be expected to send a ransom demand to the data owner in exchange for providing the data owner with a decryption key to decrypt encrypted data of the honeypot system. Because the ransomware may employ an adaptive cost mechanism, the ransom demand for the honeypot system may be relatively low, due to the small size and minimal complexity of that honeypot system and/or its data. Because the ransom amount may be relatively small, the data owner may simply pay the amount and, in return, receive the decryption key from the attacker. Because the decryption key may typically be used for multiple attacks by the same attacker, the owner may then be able to decrypt not only the honeypot system data, but also any other data that was, or becomes, encrypted by the ransomware.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that the use of an asymmetric encryption scheme by a ransomware process may be leveraged to minimize the cost and other impacts of the ransomware on data. An embodiment may leverage an adaptive cost mechanism of ransomware to minimize the cost and other impacts of the ransomware on data. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM). Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Example Functional/Operational Aspects of an Embodiment

With attention now to FIG. 1, an example functional diagram 100 according to one embodiment is disclosed. As shown, an embodiment of the invention may be implemented in an environment that may comprise, for example, a datacenter 102 that includes data storage 104, a control module 106, and a dummy, or honeypot, system 106. An attacker 108 may control the implementation of a ransomware process 110. Note that while, for the sake of clarity, the ransomware process 110 is depicted outside of the datacenter 102 in the example of FIG. 1, in one actual scenario, the ransomware process 110 runs in the datacenter 102 and communicates with the attacker 108 which is located outside of, or external to, the datacenter 102. It is noted further that while the datacenter 102 is depicted as including a honeypot system 106, that honeypot system 106 may or may not be a permanent part of the datacenter 102. In one embodiment, the honeypot system 106 is an ephemeral entity that may be created-for-the-purpose, that is, ad hoc, when the ransomware 110 is detected and, after the decryption key has been obtained as explained below, the honeypot system 106 may be removed.

Operationally, the control module 104 may become aware that the ransomware process 110 is running and may then create (1) a snapshot 112 of the ransomware 110. If the honeypot system 106 does not already exist, it may be created, and the snapshotted ransomware system 112 installed (2) on the honeypot system 106. The ransomware running on the honeypot system 106 may notify (3) the attacker 108 accordingly. The attacker 108 may then submit a ransom request (4) to the data owner, represented by the datacenter 102.

An amount of the ransom request (4) may be based on one or more attributes of the honeypot system 106 such as, for example, the amount of data stored at the honeypot system 106, and the type(s) of data storage at the honeypot system 106. That is, the ransomware 110, which has been snapshotted and is running at the honeypot system 106 may implement an adaptive cost mechanism such that the amount of the ransom request is tied in some way to data attributes, such as the type and/or amount of data for example, as noted above.

In response to the ransom request (4), the data owner may pay (5) to the attacker 108 the requested amount. In return, the attacker 108 may then provide (6) the decryption key to the data owner. In this way, the data owner may be able to obtain the decryption key at a relatively low cost, and then may use that decryption key to aid in the protection of high value data that is, or may become, encrypted by the ransomware process.

Note that the operations and communications (1), (3), and (5) may, in one embodiment, be performed by the control module 104. In an embodiment, the control module 104 may receive the communications (2), (4) and (6).

Note further that the example of ransomware that employs asymmetric encryption of data is provided only by way of example, and is not intended to limit the scope of the invention in any way. Thus, an embodiment may be implemented for use with ransomware that does not employ asymmetric encryption.

C. Example Methods

Figure 2:
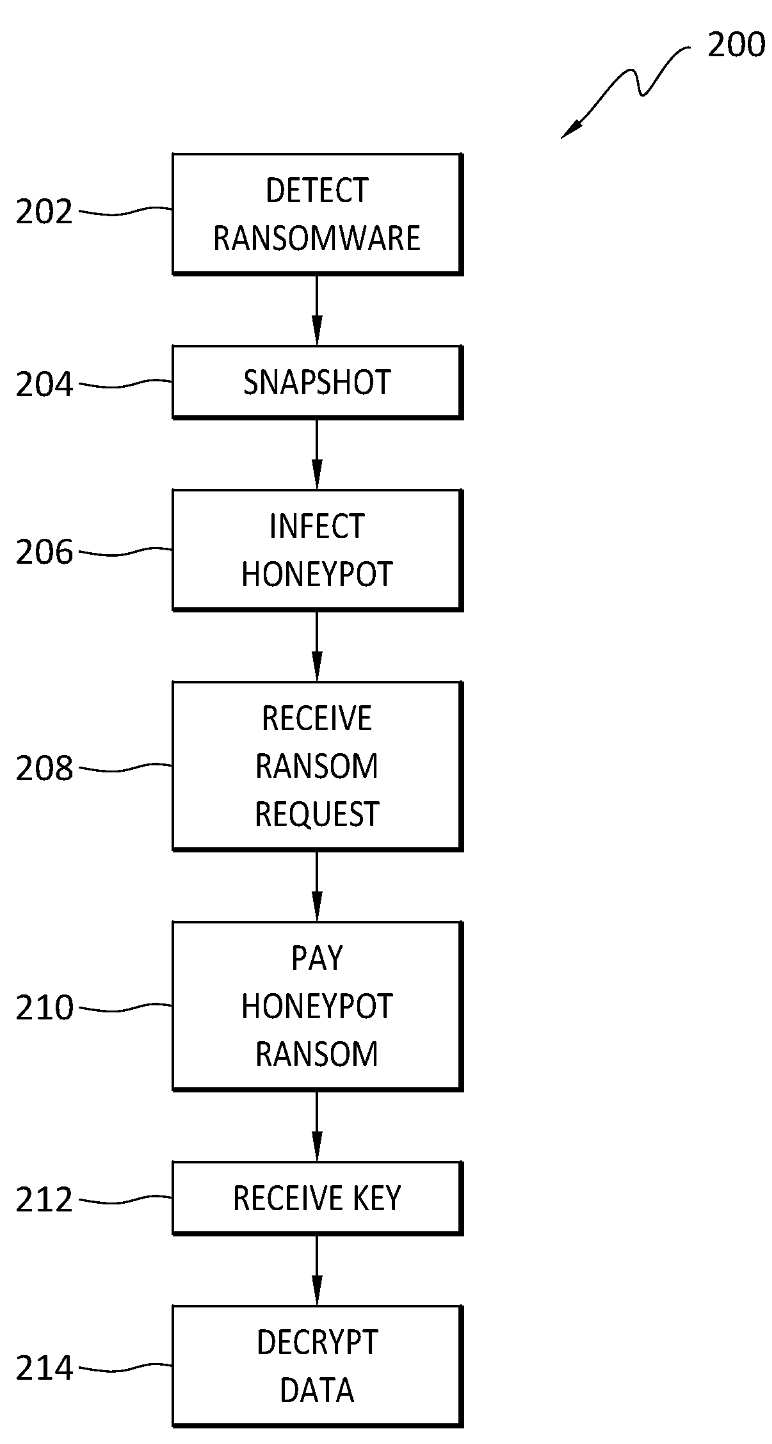
FIG. 2 discloses an example method according to one embodiment.

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

As noted earlier, ransomware processes that employ asymmetric encryption may present challenges. Such ransomware processes may use a public key of the ransomware to encrypt data, and the private key hosted by the adversary may be used to decrypt the encrypted data. Note that in some instances, an attacker may have multiple keys, one for each ransomware instance that was sent out by the attacker. Each instance may infect several different hosts. Thus, a weakness of this type of ransomware is that the private key is shared among attacks, that is, the same private key may be used to carry out multiple attacks by the ransomware. In acknowledgement of the fact that different data may have different respective values, many ransomware platforms employ an adaptive cost mechanism. For example, an individual is unlikely to be able, or willing, to pay an amount that might be requested of a large entity such as a hospital for example.

With these points in view, an embodiment may operate to detect the ransomware and snapshot it. The ransomware may then be used to infect a minimal system, such as a honeypot system, that may include a type and/or amount of data that may be a suitable target for the ransomware. A demand for money, and/or some other type of compensation, may be received from the attacker. Due to the use of the adaptive cost mechanism by the ransomware, this demand may be for an amount much lower than would be expected in a ransom request pertaining to system data, such as the data at a datacenter. In this case, the data owner may decline to pay the ransom demanded for the actual data of the main system of the data owner, but may agree to pay the ransom that was requested for the honeypot system data.

The attacker, concluding that the honeypot system is an accidental infection, may then share the private key following the payment, by the data owner, of the lower amount of money for decryption. Then, the data owner may will be able to use that same key to decrypt the data of the primary system. In this way, an embodiment may implement and use a honeypot system to induce an attacker to supply the private decryption key for a lesser payment amount. As a result, the data owner may pay a relatively smaller amount of money to decrypt main system data than would have to be paid if a disclosed embodiment were not employed.

Directing attention now to FIG. 2, an example method according to one embodiment of the invention is indicated at 200. The method 200, which may be performed at a data storage site such as a datacenter for example, may begin with the detection 202 of ransomware, which may run at a site such as a datacenter. Various approaches may be used for the detection of ransomware, such as by monitoring data writing and data transmission patterns, for example, where a process that writes to data and then transmits that data to an external site may be identified as ransomware.

Upon detection 202 of the ransomware, a snapshot may be taken 204 of the ransomware process to create an instance of the ransomware process that can be run on another system. The snapshot may then be used to infect 206 a honeypot system, which may run in a datacenter. The honeypot system may contain a token amount of data that, while of little value to the business entity that has been attacked, may nonetheless be a sufficiently attractive target for the ransomware. Note that in some cases, the ransomware may not actually present the key to the data owner for use by the data owner in decrypting the data but, rather, the ransomware may decrypt the data itself, and then delete the key, that is, the private key, after decryption is complete. In that case, an embodiment may operate to snapshot communications, such as between the ransomware and the attacker, and/or snapshot the ransomware operation again to capture the private key.

The attacker may become aware that the ransomware is running in the honeypot system, and that the ransomware has encrypted some or all of the data in the honeypot system. The attacker may thus transmit a ransom request which is received 208 by the data owner. In some instances, the data owner may receive 208 a ransom request concerning data in the datacenter, and another ransom request concerning data in the honeypot system.

In an embodiment, the data owner may decline to pay the ransom request concerning the data in the datacenter, since that request, reflecting an adaptive cost mechanism implemented in the ransomware that is aware of the relatively higher value of the datacenter data, may demand a significant amount of money. On the other hand however, the data owner may agree to pay 210 the ransom request for the honeypot data, which request, according to the adaptive cost mechanism, may be for a relatively small amount of money due to the minimal value of the honeypot system data.

As a result of payment 210 of the ransom request for the honeypot system data, the data owner may receive 212 the decryption key from the attacker. The decryption key may then be used to decrypt 214 any data that has been encrypted by the ransomware. Thus, the use of the honeypot system mechanism may enable a data owner to obtain the decryption key at a relatively low cost, and thereby decrypt the data for minimal expense.

D. Further Example Embodiments

Following are some further example embodiments of the invention. These are presented only by way of example and are not intended to limit the scope of the invention in any way.

Embodiment 1. A method, comprising: detecting, at a data storage site, a ransomware process; taking a snapshot of the ransomware process; using the snapshot to install an instance of the ransomware process on a honeypot system; and receiving, from an attacker, a first demand for a ransom of data stored at the data storage site; and receiving, from the attacker, a second demand for a ransom of data stored in the honeypot system, and ransom of the second demand is less than the ransom of the first demand.

Embodiment 2. The method as recited in any preceding embodiment, wherein the ransomware process uses asymmetric encryption process that encrypts the data stored at the data storage site, and encrypts the data stored in the honeypot system.

Embodiment 3. The method as recited in any preceding embodiment, wherein the ransomware uses a public key to encrypt the data at the data storage site, and the ransomware uses the same public key to encrypt the data stored in the honeypot system.

Embodiment 4. The method as recited in any preceding embodiment, wherein a difference between the ransom of the first demand and the ransom of the second demand is due to an adaptive cost mechanism used by the ransomware.

Embodiment 5. The method as recited in any preceding embodiment, wherein the data at the data storage site is decrypted after payment of the ransom of the second demand, but without requiring payment of the first ransom demand.

Embodiment 6. The method as recited in any preceding embodiment, wherein a private key is received from the attacker after payment of the ransom of the second demand, but without payment of the ransom of the first demand.

Embodiment 7. The method as recited in embodiment 6, wherein the data at the data storage site is decrypted with the private key.

Embodiment 8. A system, comprising hardware and/or software, operable to perform any of the operations, methods, or processes, or any portion of any of these, disclosed herein.

Embodiment 9. A non-transitory storage medium having stored therein instructions that are executable by one or more hardware processors to perform operations comprising the operations of any one or more of embodiments 1-8.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
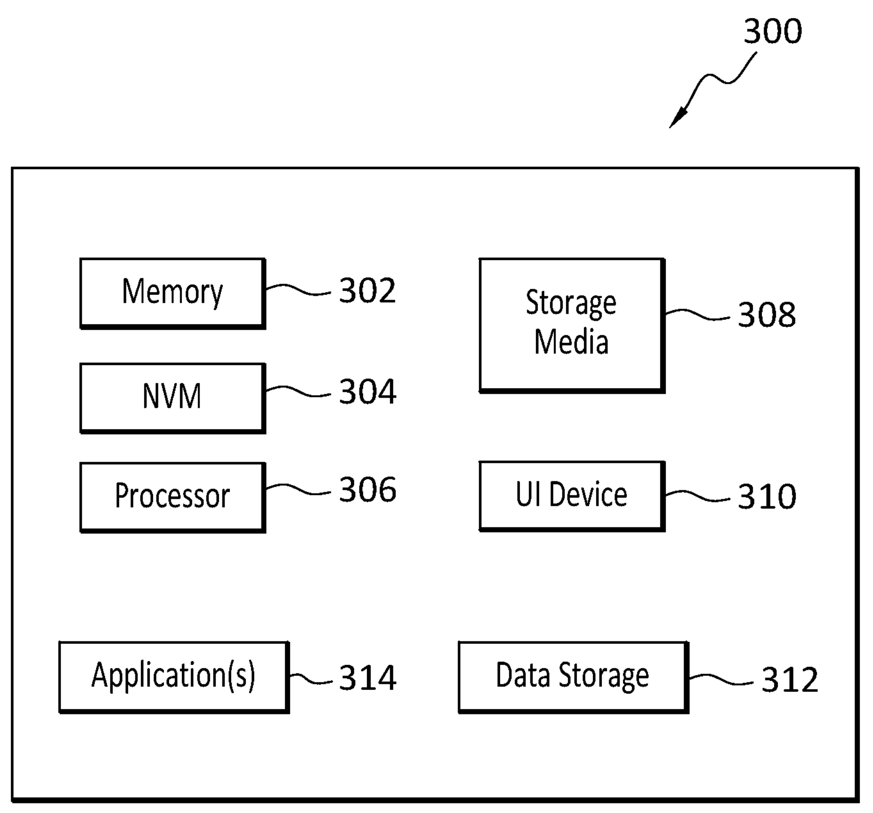
FIG. 3 discloses an example computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

detecting, at a data storage site, a ransomware process;

taking a snapshot of the ransomware process;

using the snapshot to intentionally install and execute an instance of the ransomware process on a honeypot system controlled by the data owner, such that the ransomware process reports an infection of the honeypot system to an attacker; and receiving, from an attacker, a first demand for a ransom of data stored at the data storage site; and receiving, from the attacker, a second demand for a ransom of data stored in the honeypot system, wherein the second demand is generated by execution of the ransomware process on the honeypot system using an adaptive cost mechanism and specifies a ransom amount lower than a ransom amount of the first demand receiving a private key from the attacker after payment of the ransom of the second demand, but without payment of the ransom of the first demand; and decrypting the data at the data storage site with the private key.

2. The method as recited in claim 1, wherein the ransomware process uses asymmetric encryption process that encrypts the data stored at the data storage site, and encrypts the data stored in the honeypot system.

3. The method as recited in claim 1, wherein the ransomware uses a public key to encrypt the data at the data storage site, and the ransomware also uses that public key to encrypt the data stored in the honeypot system.

4. The method as recited in claim 1, wherein a difference between the ransom of the first demand and the ransom of the second demand is due to an adaptive cost mechanism used by the ransomware.

5. The method as recited in claim 1, wherein the data at the data storage site is decrypted after payment of the ransom of the second demand, but without requiring payment of the first ransom demand.

6. A non-transitory storage medium having stored therein instructions that are executable by one or more hardware processors to perform operations comprising:

detecting, at a data storage site, a ransomware process;

taking a snapshot of the ransomware process;

using the snapshot to intentionally install and execute an instance of the ransomware process on a honeypot system controlled by the data owner, such that the ransomware process reports an infection of the honeypot system to an attacker;

receiving, from an attacker, a first demand for a ransom of data stored at the data storage site; and receiving, from the attacker, a second demand for a ransom of data stored in the honeypot system, wherein the second demand is generated by execution of the ransomware process on the honeypot system using an adaptive cost mechanism and specifies a ransom amount lower than a ransom amount of the first demand;

receiving a private key from the attacker after payment of the ransom of the second demand, but without payment of the ransom of the first demand; and decrypting the data at the data storage site with the private key.

7. The non-transitory storage medium as recited in claim 6, wherein the ransomware process uses asymmetric encryption process that encrypts the data stored at the data storage site, and encrypts the data stored in the honeypot system.

8. The non-transitory storage medium as recited in claim 6, wherein the ransomware uses a public key to encrypt the data at the data storage site, and the ransomware also uses that public key to encrypt the data stored in the honeypot system.

9. The non-transitory storage medium as recited in claim 6, wherein a difference between the ransom of the first demand and the ransom of the second demand is due to an adaptive cost mechanism used by the ransomware.

10. The non-transitory storage medium as recited in claim 6, wherein the data at the data storage site is decrypted after payment of the ransom of the second demand, but without requiring payment of the first ransom demand.

11. A system, comprising:

one or more hardware processors; and a non-transitory storage medium having stored therein instructions that are executable by the one or more hardware processors to perform operations comprising:

detecting, at a data storage site, a ransomware process;

taking a snapshot of the ransomware process;

using the snapshot to intentionally install and execute an instance of the ransomware process on a honeypot system controlled by the data owner, such that the ransomware process reports an infection of the honeypot system to an attacker;

receiving, from an attacker, a first demand for a ransom of data stored at the data storage site; and receiving, from the attacker, a second demand for a ransom of data stored in the honeypot system, wherein the second demand is generated by execution of the ransomware process on the honeypot system using an adaptive cost mechanism and specifies a ransom amount lower than a ransom amount of the first demand;

receiving a private key from the attacker after payment of the ransom of the second demand, but without payment of the ransom of the first demand; and decrypting the data at the data storage site with the private key.

12. The system as recited in claim 11, wherein the ransomware process uses asymmetric encryption process that encrypts the data stored at the data storage site, and encrypts the data stored in the honeypot system.

13. The system as recited in claim 11, wherein the ransomware uses a public key to encrypt the data at the data storage site, and the ransomware also uses that public key to encrypt the data stored in the honeypot system.

14. The system as recited in claim 11, wherein a difference between the ransom of the first demand and the ransom of the second demand is due to an adaptive cost mechanism used by the ransomware.

15. The system as recited in claim 11, wherein the data at the data storage site is decrypted after payment of the ransom of the second demand, but without requiring payment of the first ransom demand.

* * * * *